H. W. MILLER.
SHEARS.
APPLICATION FILED NOV. 1, 1916.
1,243,540.
Patented Oct. 16, 1917.
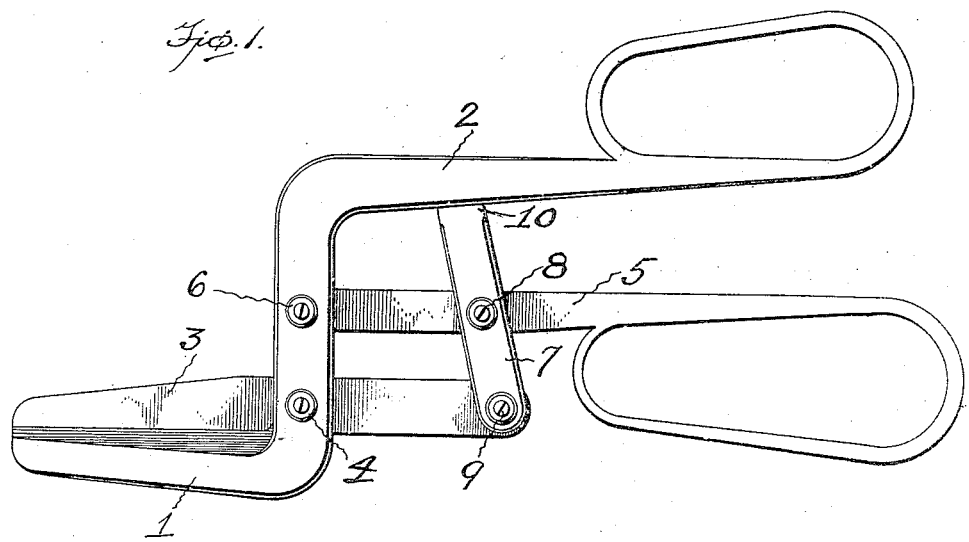
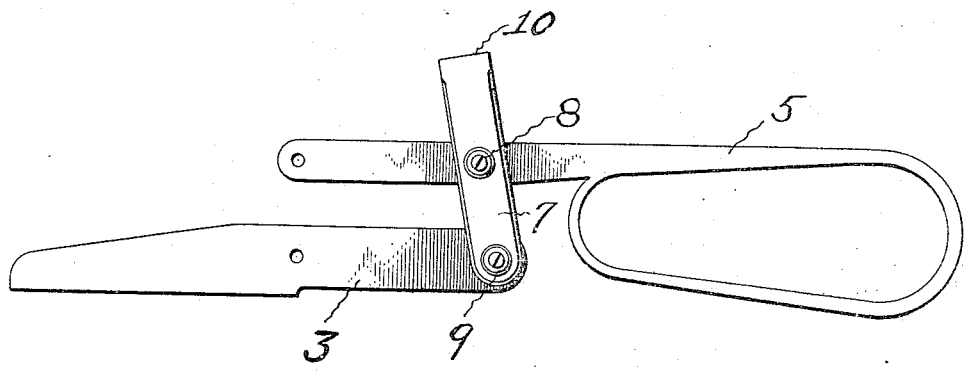
Hugh Wilber Miller, Inventor

UNITED STATES PATENT OFFICE.

HUGH W. MILLER, OF PRINCETON, INDIANA.

SHEARS.

1,243,540.  Specification of Letters Patent.  Patented Oct. 16, 1917.

Application filed November 1, 1916. Serial No. 128,934.

*To all whom it may concern:*

Be it known that I, HUGH WILBER MILLER, a citizen of the United States, residing at Princeton, county of Gibson, and State of Indiana, have invented certain new and useful Improvements in Shears, of which the following is a specification.

This invention relates to shears, particularly those intended for use in cutting thick or heavy material, such as metal, for instance.

My object is to provide shears of improved construction wherein the handles will be so disposed that there will be suitable clearance below them, when cutting, to enable the hand to be freely worked without striking the material being cut; further, to provide shears having an improved leverage resulting in greater power; still further, to provide shears having a combined link and stop device.

Other objects and advantages will appear more fully from the following description.

In the accompanying drawings Figure 1 is a side elevation of the shears when closed; Fig. 2 a similar view of one of the blades, handle, and combined stop and link.

One of the shear blades 1 has its handle 2 offset considerably thereabove, the two forming a combined bent structure whereby the handle 2 is disposed considerably above the blade 1 to leave a relatively large space therebelow for the operation of the remaining handle.

The other shear-blade 3 is pivoted to the blade 1 at 4 and extends rearwardly therefrom. The handle 5 which is pivoted to the shank of the blade 1 at 6 at its forward end, is connected or linked to the rearward extension of the blade 3 by a combined link and stop 7 to which it is pivoted at 8, intermediate the ends of said link and stop 7. The lower end of the link and stop 7 is pivoted at 9 to the rear end of the blade 3. The upper end of the link 7 is provided with a face or abutment 10 which serves as a stop to limit the closing movement of the blades 1 and 3 by contact with the lower edge of the handle 2.

The leverage afforded by the manner in which the handle 5 is pivoted to the shank of the blade 1 and to the rearward extension of the blade 3 by the link 7, enables the operator to apply great power to the blade 3, adapting the invention for cutting heavy material or metal with facility. The handle 5 and parts above described operating in the space provided by the form of the handle 2 in relation to the blade 1, gives ample clearance over the material when the shears are being operated. The stop end 10 prevents too great overlapping of the shear blades 1 and 3 and forms an effective arresting device to predetermine the relative positions of the handles 2 and 5 when the shears are closed.

Having thus described my invention, what I claim as new and desire to secure by Letters Patent, is:

Shears comprising a lower blade having a cutting edge, a handle arranged above the blade and extending in an opposite direction therefrom, a portion which connects the blade and handle and is disposed substantially at right angles to them, a straight blade pivoted intermediate its ends to the connecting part aforesaid and disposed above the first-named blade, with its cutting edge arranged to coöperate with the cutting edge of the first-named blade to said straight blade and being arranged substantially parallel to the handle first-named, another handle pivoted to the connecting portion at a point above the pivot of the straight blade and extending substantially parallel to the handle first-named, and a link whose lower end is pivoted to the rearward extension of the straight blade and whose middle portion is pivoted to the last-named handle and having its end projecting above the upper edge of the second handle and serving as a stop for the first-named handle to limit the closing of the shears, the straight blade and the second handle being adapted to engage to limit the opening of the blades, the aforesaid handles being disposed above the cutting edges of the blades, whereby there is provided clearance to permit free working of the handles when cutting the material.

In testimony whereof, I hereunto affix my signature.

H. W. MILLER.